US012694517B2

(12) United States Patent  (10) Patent No.: US 12,694,517 B2
Lo et al.  (45) Date of Patent: Jul. 28, 2026

(54) OBJECT DETECTION IN PAIRED IMAGING

(71) Applicant: DUKE UNIVERSITY, Durham, NC (US)

(72) Inventors: Joseph Lo, Durham, NC (US); Yinhao Ren, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 346 days.

(21) Appl. No.: 18/208,196

(22) Filed: Jun. 9, 2023

(65) Prior Publication Data

US 2023/0401702 A1  Dec. 14, 2023

Related U.S. Application Data

(60) Provisional application No. 63/350,635, filed on Jun. 9, 2022.

(51) Int. Cl.
G06T 7/00 (2017.01)
G06V 10/25 (2022.01)
G06V 10/74 (2022.01)

(52) U.S. Cl.
CPC ............ G06T 7/0012 (2013.01); G06V 10/25 (2022.01); G06V 10/761 (2022.01);
(Continued)

(58) Field of Classification Search
CPC ......... G06T 7/0012; G06T 2207/30068; G06T 2207/30096; G06T 2207/10016;
(Continued)

(56) References Cited

U.S. PATENT DOCUMENTS 7,646,902 B2  1/2010  Chan et al.
7,840,046 B2  11/2010  Jerebko et al.
(Continued)

OTHER PUBLICATIONS

Wang, Juan, et al., "A Context-Sensitive Deep Learning Approach for Microcalcification Detection in Mammograms," Pattern Recognition, Jun. 2018 (accessible Jan. 10, 2018), 32 pages, vol. 78.
(Continued)

*Primary Examiner* — Jennifer Mehmood
*Assistant Examiner* — Pardis Sohraby
(74) *Attorney, Agent, or Firm* — Talem IP Law, LLP

(57) ABSTRACT

A method of object detection in paired imaging includes detecting areas of interest for each image of a set of multi-view images, each detected area of interest having a corresponding initial probability of being an area of interest; determining a matching probability for each detected area of interest across the set of multi-view images such that detected areas of interest from one image of the set of multi-view images are assigned matching probabilities with respect to detected areas of interest of other images of the set of multi-view images; generating a modified probability for each detected area of interest according to one or more object-specific weighting factors and one or more of the matching probabilities for that detected area of interest; adjusting the initial probability of each detected area of interest using the modified probability to generate a refined probability for each detected area of interest; and identifying the detected areas of interest in each image that have refined probabilities that meet a minimum threshold probability.

17 Claims, 5 Drawing Sheets

(52) U.S. Cl.
CPC .............. *G06T 2207/30068* (2013.01); *G06T 2207/30096* (2013.01); *G06V 2201/07* (2022.01)

(58) Field of Classification Search
CPC . G06T 2207/10116; G06T 2207/20084; G06T 7/30; G06V 10/25; G06V 10/761; G06V 2201/07; G06V 2201/03; G06V 10/82; G06V 10/255
USPC ........................................................ 382/128
See application file for complete search history.

(56) References Cited

U.S. PATENT DOCUMENTS

| | | | | |
|---|---|---|---|---|
| 9,224,066 | B2 * | 12/2015 | Lin ....................... | G06V 10/751 |
| 9,401,047 | B2 * | 7/2016 | Bogoni ................... | G06T 19/00 |
| 2007/0195996 | A1 * | 8/2007 | Kitamura ............. | G06V 40/165 |
| | | | | 382/103 |
| 2010/0166267 | A1 | 7/2010 | Zhang et al. | |
| 2019/0295711 | A1 * | 9/2019 | Wakasugi .............. | G06V 10/50 |
| 2020/0012903 | A1 * | 1/2020 | Greene ..................... | G06T 7/70 |
| 2020/0364855 | A1 | 11/2020 | Ha | |
| 2021/0034865 | A1 * | 2/2021 | Nord ..................... | G06F 18/254 |
| 2021/0142149 | A1 * | 5/2021 | Skans .............. | G06F 18/24143 |
| 2023/0267337 | A1 * | 8/2023 | Esmaeilzadeh ........ | G06N 3/047 |
| | | | | 706/15 |

OTHER PUBLICATIONS

Wang, Xiaolong, et al., "Non-Local Neural Networks," Apr. 13, 2018 (accessible Nov. 21, 2017), 10 pages, arXiv.

Wei, Jun, et al., "Computer-aided Detection of Breast Masses on Mammograms: Dual System Approach with Two-view Analysis," Medical Physics, Oct. 2009 (accessible Sep. 8, 2009), pp. 4451-4460, vol. 36, issue 10.

Yang, Zhicheng, et al., "MommiNet: Mammographic Multi-View Mass Identification Networks," Medical Image Computing and Computer Assisted Intervention—MICCAI 2020, Lecture Notes in Computer Science, Sep. 29, 2020, 11 pages, vol. 12266.

Yang, Zhicheng, et al., "MommiNet-v2: Mammographic Multi-View Mass Identification Networks," Medical Image Analysis, Oct. 2021 (accessible Aug. 2, 2021), 11 pages, vol. 73, article 102204.

Yao, Melissa Min-Szu, et al., "BI-RADS Category 5 Assessments at Diagnostic Breast Imaging: Outcomes Analysis Based on Lesion Descriptors," Academic Radiology, Aug. 2019 (accessible Sep. 5, 2018), pp. 1-5, vol. 26, issue 8.

You, Chenyu, et al., "SimCVD: Simple Contrastive Voxel-Wise Representation Distillation for Semi-Supervised Medical Image Segmentation," IEEE Transactions on Medical Imaging, Sep. 2022 (accessible Mar. 23, 2022), 24 pages, vol. 41, issue 9.

Yousefi, Mina, et al., "Mass Detection in Digital Breast Tomosynthesis Data Using Convolutional Neural Networks and Multiple Instance Learning," Computers in Biology and Medicine, May 2018 (accessible Apr. 12, 2018), 28 pages, vol. 96.

Ren, Shaoqing, et al., "Faster R-CNN: Towards Real-Time Object Detection with Region Proposal Networks," Proceedings of the 29th International Conference on Neural Information Processing Systems—vol. 1, NIPS'15, Dec. 7, 2015, 9 pages, MIT Press.

Ren, Yinhao, et al., "Ipsilateral Lesion Detection Refinement for Tomosynthesis," IEEE Transactions on Medical Imaging, Oct. 2023 (accessible May 25, 2023), 29 pages, vol. 42, issue 10.

Arasu, Vignesh A., et al., "Benefit of Semiannual Ipsilateral Mammographic Surveillance Following Breast Conservation Therapy," Radiology, Aug. 2012, pp. 371-377, vol. 264, issue 2.

Buda, Mateusz, et al., "A Data Set and Deep Learning Algorithm for the Detection of Masses and Architectural Distortions in Digital Breast Tomosynthesis Images," JAMA Network Open, Aug. 16, 2021, pp. 1-10, vol. 4, issue 8, article e2119100.

Burnside, Elizabeth S., et al., "Differential Value of Comparison with Previous Examinations in Diagnostic Versus Screening Mammography," American Journal of Roentgenology, Nov. 2002 (presented Apr.-May 2001), pp. 1173-1177, vol. 179, issue 5.

Cai, Hongmin, et al., "Breast Microcalcification Diagnosis Using Deep Convolutional Neural Network from Digital Mammograms," Computational and Mathematical Methods in Medicine, Mar. 3, 2019, pp. 1-10, vol. 2019, article 2717454.

Campanini, Renato, et al., "A Novel Featureless Approach to Mass Detection in Digital Mammograms Based on Support Vector Machines," Physics in Medicine and Biology, Mar. 21, 2004 (accessible Feb. 24, 2004), pp. 961-975, vol. 49, issue 6.

Cao, Yue, et al., "GCNet: Non-Local Networks Meet Squeeze-Excitation Networks and Beyond," Apr. 25, 2019, 10 pages, arXiv.

Chan, Heang-Ping, et al., "Deep Learning in Medical Image Analysis," Deep Learning in Medical Image Analysis, Advances in Experimental Medicine and Biology, Feb. 7, 2020, 26 pages, vol. 1213, Springer International Publishing.

Chen, Weihua, et al., "Beyond Triplet Loss: A Deep Quadruplet Network for Person Re-Identification," Apr. 6, 2017, 10 pages, arXiv.

Chen, Yan, et al., "Measuring Reader Fatigue in the Interpretation of Screening Digital Breast Tomosynthesis (DBT)," The British Journal of Radiology, Feb. 2023 (accessible Jan. 12, 2023), 8 pages, vol. 96, issue 1143, article 20220629.

Conant, Emily F., et al., "Association of Digital Breast Tomosynthesis vs Digital Mammography With Cancer Detection and Recall Rates by Age and Breast Density," JAMA Oncology, May 1, 2019 (accessible Feb. 28, 2019), 20 pages, vol. 5, issue 5.

Dai, Bo, et al., "Detecting Visual Relationships with Deep Relational Networks," Apr. 12, 2017 (accessible Apr. 11, 2017), 11 pages, arXiv.

Eltonsy, Nevine H., et al., "A Concentric Morphology Model for the Detection of Masses in Mammography," IEEE Transactions on Medical Imaging, Jun. 2007 (accessible May 29, 2007), pp. 880-889, vol. 26, issue 6.

Fan, Ming, et al., "Computer-Aided Detection of Mass in Digital Breast Tomosynthesis Using a Faster Region-Based Convolutional Neural Network," Methods, Aug. 2019 (accessible Feb. 13, 2019), 23 pages, vol. 166.

Gandomkar, Ziba, et al., "Visual Search in Breast Imaging," The British Journal of Radiology, Oct. 1, 2019 (accessible Jul. 18, 2019), 15 pages, vol. 92, issue 1102, article 20190057.

Geras, Krzysztof J., et al., "High-Resolution Breast Cancer Screening with Multi-View Deep Convolutional Neural Networks," Jun. 28, 2018 (accessible Mar. 21, 2017), 9 pages, arXiv.

Hagos, Yeman Brhane, et al., "Improving Breast Cancer Detection Using Symmetry Information with Deep Learning," Aug. 17, 2018, 8 pages, arXiv.

He, Kaiming, et al., "Mask R-CNN," Jan. 24, 2018 (accessible Mar. 20, 2017), 12 pages, arXiv.

Hornik, Kurt, et al., "Multilayer Feedforward Networks are Universal Approximators," Neural Networks, Jan. 1989, pp. 359-366, vol. 2, issue 5.

Hu, Han, et al., "Relation Networks for Object Detection," Jun. 14, 2018, 11 pages, arXiv.

Kim, Hyo-Eun, et al., "Changes in Cancer Detection and False-Positive Recall in Mammography Using Artificial Intelligence: A Retrospective, Multireader Study," The Lancet Digital Health, Mar. 2020 (accessible Feb. 6, 2020), pp. e138-e148, vol. 2, issue 3.

Kooi, Thijs, et al., "Large Scale Deep Learning for Computer Aided Detection of Mammographic Lesions," Medical Image Analysis, Jan. 2017 (accessible Aug. 2, 2016), pp. 303-312, vol. 35.

Lee, Rebecca Sawyer, et al., "A Curated Mammography Data Set for Use in Computer-Aided Detection and Diagnosis Research," Scientific Data, Dec. 19, 2017, 9 pages, vol. 4, issue 1, article 170177.

Lehman, Constance D., et al., "Diagnostic Accuracy of Digital Screening Mammography With and Without Computer-Aided Detection," JAMA Internal Medicine, Nov. 1, 2015 (accessible Sep. 28, 2015), 19 pages, vol. 175, issue 11.

Lin, Tsung-Yi, et al., "Focal Loss for Dense Object Detection," Feb. 7, 2018 (accessible Aug. 7, 2017), 10 pages, arXiv.

(56) References Cited

OTHER PUBLICATIONS

Liu, Li, et al., "Deep Learning for Generic Object Detection: A Survey," International Journal of Computer Vision, Feb. 2020 (accessible Oct. 31, 2019), 58 pages, vol. 128, issue 2.

Liu, Yuhang, et al., "Cross-View Correspondence Reasoning Based on Bipartite Graph Convolutional Network for Mammogram Mass Detection," 2020 IEEE/CVF Conference on Computer Vision and Pattern Recognition (CVPR), Jun. 2020, pp. 3812-3822, IEEE.

Lotter, William, et al., "Robust Breast Cancer Detection in Mammography and Digital Breast Tomosynthesis Using an Annotation-Efficient Deep Learning Approach," Nature Medicine, Feb. 2021 (accessible Jan. 11, 2021), 35 pages, vol. 27, issue 2.

Lowry, Kathryn P., et al., "Screening Performance of Digital Breast Tomosynthesis vs Digital Mammography in Community Practice by Patient Age, Screening Round, and Breast Density," JAMA Network Open, Jul. 28, 2020, 14 pages, vol. 3, issue 7, article e2011792.

Lu, Zhichao, et al., "RetinaTrack: Online Single Stage Joint Detection and Tracking," Mar. 30, 2020, 11 pages, arXiv.

Ma, Jiechao, et al., "Cross-View Relation Networks for Mammogram Mass Detection," Jul. 1, 2019, 8 pages, arXiv.

Mckinney, Scott Mayer, et al., "International Evaluation of an AI System for Breast Cancer Screening," Nature, Jan. 2, 2020, 35 pages, vol. 577, issue 7788.

Mordang, Jan-Jurre, et al., "Automatic Microcalcification Detection in Multi-Vendor Mammography Using Convolutional Neural Networks," Breast Imaging, Lecture Notes in Computer Science, Jun. 17, 2016, pp. 35-42, vol. 9699, Springer International Publishing.

Padayachee, Jayanethie, et al., "Mammographic CAD: Correlation of Regions in Ipsilateral Views—a Pilot Study," South African Journal of Radiology, Aug. 2009, pp. 48-54, vol. 13, issue 3.

Park, Jungkyu, et al., "Lessons from the First DBTex Challenge," Nature Machine Intelligence, Jul. 19, 2021, pp. 735-736, vol. 3, issue 8.

Qian, Wei, et al., "Computer-Aided Mass Detection Based on Ipsilateral Multiview Mammograms," Academic Radiology, May 2007 (accessible Apr. 16, 2007), pp. 530-538, vol. 14, issue 5.

Redmon, Joseph, et al., "YOLO9000: Better, Faster, Stronger," Dec. 25, 2016, 9 pages, arXiv.

Ren, Yinhao, et al., "Retina-Match: Ipsilateral Mammography Lesion Matching in a Single Shot Detection Pipeline," Medical Image Computing and Computer Assisted Intervention—MICCAI 2021, Lecture Notes in Computer Science, Sep. 21, 2021, pp. 345-354, vol. 12905, Springer International Publishing.

Ribli, Dezs, et al., "Detecting and Classifying Lesions in Mammograms with Deep Learning," Scientific Reports, Mar. 15, 2018, pp. 1-7, vol. 8, issue 1, article 4165.

Roelofs, Antonius A. J., et al., "Importance of Comparison of Current and Prior Mammograms in Breast Cancer Screening," Radiology, Jan. 2007, pp. 70-77, vol. 242, issue 1.

Redmon, Joseph, et al., "You Only Look Once: Unified, Real-Time Object Detection," 2016 IEEE Conference on Computer Vision and Pattern Recognition (CVPR), Jun. 2016, pp. 779-788, IEEE.

Samala, Ravi K, et al., "Multi-Task Transfer Learning Deep Convolutional Neural Network: Application to Computer-Aided Diagnosis of Breast Cancer on Mammograms," Physics in Medicine & Biology, Nov. 10, 2017, 23 pages, vol. 62, issue 23.

Samala, Ravi K., et al., "Breast Cancer Diagnosis in Digital Breast Tomosynthesis: Effects of Training Sample Size on Multi-Stage Transfer Learning Using Deep Neural Nets," IEEE Transactions on Medical Imaging, Mar. 2019 (accessible Sep. 16, 2018), 26 pages, vol. 38, issue 3.

Sampat, Mehul P., et al., "A Model-based Framework for the Detection of Spiculated Masses on Mammography," Medical Physics, May 2008 (accessible Apr. 28, 2008), pp. 2110-2123, vol. 35, issue 5.

Schroff, Florian, et al., "FaceNet: A Unified Embedding for Face Recognition and Clustering," Jun. 17, 2015 (accessible Mar. 12, 2015), 10 pages, arXiv.

Shoshan, Yoel, et al., "Artificial Intelligence for Reducing Workload in Breast Cancer Screening with Digital Breast Tomosynthesis," Radiology, Apr. 2022 (accessible Jan. 18, 2022), pp. 69-77, vol. 303, issue 1.

Sun, Xuejun, et al., "Ipsilateral-Mammogram Computer-Aided Detection of Breast Cancer," Computerized Medical Imaging and Graphics, Apr. 2004 (accessible Mar. 10, 2004), pp. 151-158, vol. 28, issue 3.

Thurfjell, Gelig M., et al., "Effect on Sensitivity and Specificity of Mammography Screening with or Without Comparison of Old Mammograms," Acta Radiologica, Jan. 2000, pp. 52-56, vol. 41, issue 1.

Valvano, Gabriele, et al., "Convolutional Neural Networks for the Segmentation of Microcalcification in Mammography Imaging," Journal of Healthcare Engineering, Apr. 9, 2019, pp. 1-9, vol. 2019, article 9360941.

Van Winkel, Suzanne L., et al., "Impact of Artificial Intelligence Support on Accuracy and Reading Time in Breast Tomosynthesis Image Interpretation: A Multi-Reader Multi-Case Study," European Radiology, Nov. 2021 (accessible May 4, 2021), pp. 8682-8691, vol. 31, issue 11.

Wang, Jingdong, et al., "Deep High-Resolution Representation Learning for Visual Recognition," Mar. 13, 2020 (accessible Aug. 20, 2019), 23 pages, arXiv.

* cited by examiner

200

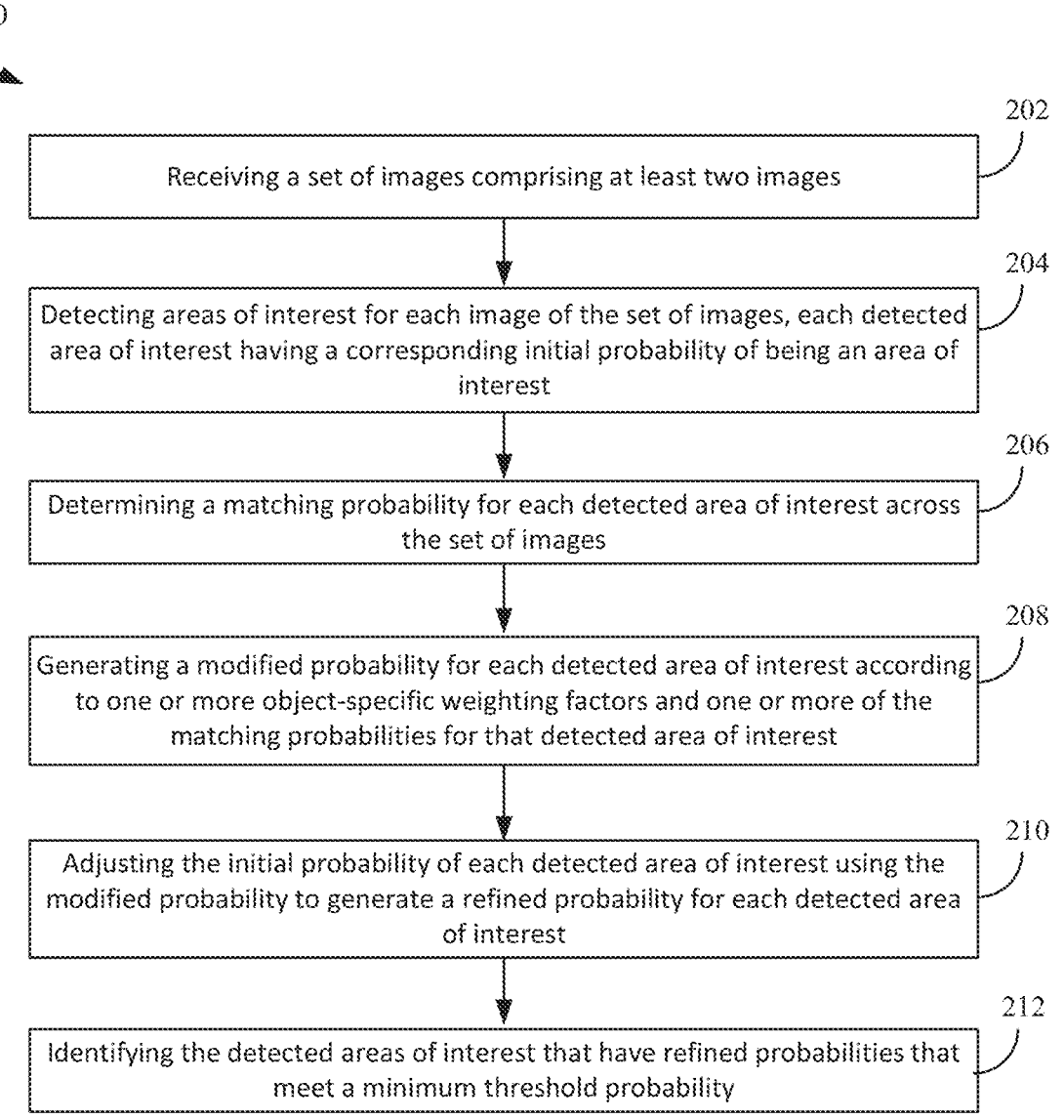

202

Receiving a set of images comprising at least two images

204

Detecting areas of interest for each image of the set of images, each detected area of interest having a corresponding initial probability of being an area of interest

206

Determining a matching probability for each detected area of interest across the set of images

208

Generating a modified probability for each detected area of interest according to one or more object-specific weighting factors and one or more of the matching probabilities for that detected area of interest

210

Adjusting the initial probability of each detected area of interest using the modified probability to generate a refined probability for each detected area of interest

212

Identifying the detected areas of interest that have refined probabilities that meet a minimum threshold probability

FIG. 2

OBJECT DETECTION IN PAIRED IMAGING

CROSS-REFERENCE TO RELATED APPLICATIONS

This application claims the benefit of U.S. Provisional Application Ser. No. 63/350,635, filed Jun. 9, 2022.

BACKGROUND

Automated object detection for medical imaging assists with focusing on areas of interest for a patient. For example, computer-aided diagnostics (CAD) has become an important aspect of detecting tissue changes in a patient that may indicate the need for further testing. Although CAD tools have made many advancements, there remain some challenges, particularly when using techniques that use multiple image views. For example, there has been interest in using deep learning models and merging information from multiple image views within a radiology exam. Clinically, the integration of lesion correspondence during screening is a complicated decision process that depends on the correct execution of several referencing steps. However, most multi-view CAD frameworks are deep-learning-based black-box techniques. Fully end-to-end designs of the deep-learning-based techniques make it difficult to analyze model behaviors and fine-tune performance. More importantly, the black-box nature of the techniques discourages clinical adoption due to the lack of explicit reasoning for each multi-view referencing step.

In addition, even if CAD applications are able to detect an object of interest in an image, most generally have difficulty distinguishing between normal tissue and an object of concern. This can lead to unnecessary further screening, or a more serious outcome of a missed diagnosis. Hence, there is an ongoing opportunity for improvements in multiple-image CAD for breast cancer and other conditions.

BRIEF SUMMARY

Object detection in paired imaging can be carried out using a three-stage pipeline. The three-stage pipeline includes single-view detection, image matching between multiple views, and refinement of single-view candidate scores from the single-view detection using modifiers combining matching probabilities between the multiple views and object-specific weighting factors of the images.

A method of object detection in paired imaging includes detecting areas of interest for each image of a set of multi-view images, each detected area of interest having a corresponding initial probability of being an area of interest; determining a matching probability for each detected area of interest across the set of multi-view images such that detected areas of interest from one image of the set of multi-view images are assigned matching probabilities with respect to detected areas of interest of other images of the set of multi-view images; generating a modified probability for each detected area of interest according to one or more object-specific weighting factors and one or more of the matching probabilities for that detected area of interest; adjusting the initial probability of each detected area of interest using the modified probability to generate a refined probability for each detected area of interest; and identifying the detected areas of interest in each image that have refined probabilities that meet a minimum threshold probability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 illustrates a method of object detection in paired imaging that can be performed using a three-stage pipeline as described herein.

DETAILED DESCRIPTION

Figure 1:
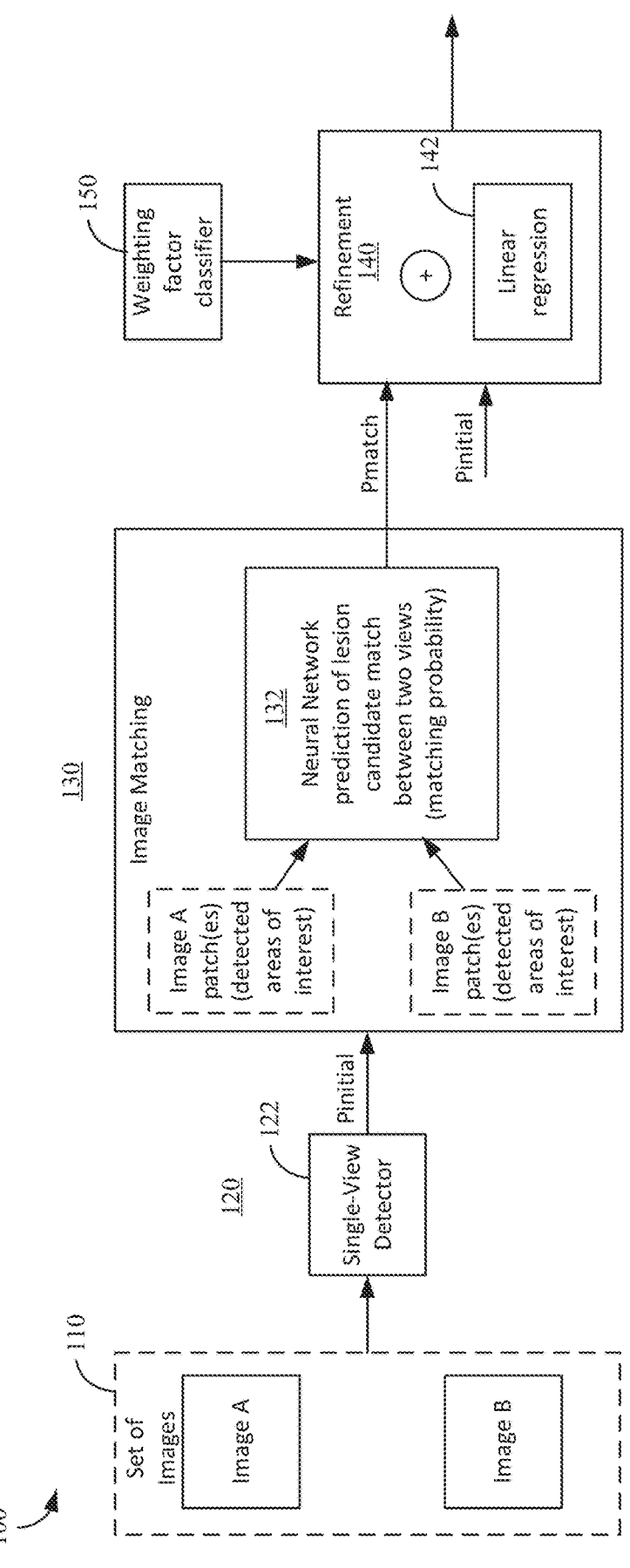
FIG. 1 illustrates a general architecture of a three-stage pipeline for object detection in paired imaging.

Object detection in paired imaging can be carried out using a three-stage pipeline. Each stage of the three-stage pipeline can have an appropriately trained model. FIG. 1 illustrates a general architecture of a three-stage pipeline for object detection in paired imaging.

Referring to FIG. 1, object detection architecture 100 for a set of images 110 can include a first stage 120 with a single-view detector 122, which may be provided in plurality for parallel processing of images or as a single detector; a second stage 130 for image matching 132; and a third stage 140 for refinement. The set of images can include images of a common target area. These images can be considered multi-view images.

In the first stage 120, each view is independently processed by a single-view detector 122, producing initial potential object detection candidates. Each candidate is assigned a single-view score (e.g., initial probability) based on the likelihood of object presence. The object refers to any area of interest in the image. For example, the object may represent or be a lesion or other structure of interest.

The single-view detector 122 can include any suitable object detection model. The single-view detector 122 can further include a patch classifier. For example, an object detection model can be used to generate an initial detection candidate and a patch classifier can be used to remove obvious false positives, as described in more detail with respect to FIG. 4. In some cases, the object detection model can be implemented using a YOLO (you only look once) algorithm. Of course, embodiments of the object detection model are not limited thereto.

In the second stage 130, matching scores between pairs of potential candidates from different views are calculated, resulting in a matching score for each pair. The image matching 132 can use a neural network, such as a Siamese network, to re-identify the potential candidates and compute a similarity between two candidates from different views, using for example, a greedy matching process. A Siamese Network is a class of neural network architectures that contain two or more subnetworks that have the same configuration with the same parameters and weights. Parameter updating is mirrored across both sub-networks. A Siamese network is used to find the similarity of two different inputs by comparing feature vectors. Siamese networks learn a similarity function and are trained to see if the two images are the same.

In the third stage 140, a final candidate score (e.g., refined probability) is computed for each candidate. The final candidate score can be derived by augmenting the candidate's initial single-view score with a modifier. This modifier is determined based on the matching score and several image features, designed to adjust the final score either upwards or downwards. For example, a linear regression model 142, whose one or more weighting factors can be trained on weighting factor classifier 150, can be applied to each potential candidate to reinforce or weaken the predicted matching score calculated in the second stage 130. This modified probability is then used to adjust the initial probability. The linear regression model 142 can be implemented using one or more trained 2 f c regressor heads, which receives an extracted latent feature from the single-view detector 122, to obtain corresponding one or more weighing factors.

FIG. 2 illustrates a method of object detection in paired imaging that can be performed using a three-stage pipeline as described herein. Referring to FIG. 2, a method 200 of object detection in paired imaging can include receiving (202) a set of images, where the set of images include at least two images (e.g., image A and image B of FIG. 1); detecting (204) areas of interest for each image of the set of images, where each detected area of interest has a corresponding initial probability of being an area of interest; determining (206) a matching probability for each detected area of interest across the set of images such that detected areas of interest from one image of the set of images are assigned matching probabilities with respect to detected areas of interest of other images of the set of images; generating (208) a modified probability for each detected area of interest according to one or more object-specific weighting factors and one or more of the matching probabilities for that detected area of interest; adjusting (210) the initial probability of each detected area of interest using the modified probability to generate a refined probability for each detected area of interest; and identifying (212) the detected areas of interest that have refined probabilities that meet a minimum threshold probability.

The detecting (204) of the areas of interest can be performed using a single-view detector such as described with respect to the single-view detector 122 of FIG. 1.

The determining (206) of the matching probability for each detected area of interest across the set of images is performed as part of a second stage (e.g., second stage 130) and can include a greedy matching algorithm when performing the matching operations. For example, determining (206) the matching probability for each detected area of interest across the set of images can include identifying pairs (e.g., from different views) of detected areas of interest across the set of images; and applying a greedy matching operation to each identified pair.

Generating (208) a modified probability and adjusting (210) the initial probability using the modified probability to generate a refined probability are performed as part of the refinement stage (e.g., third stage 140 of FIG. 1).

The described three-stage pipeline and method of object detection in paired imaging can be utilized in any medical imaging scenario where two or more complementary views, taken from different angles, are required. This situation is common in various radiographic examinations, such as chest radiography (which compares posteroanterior and lateral views), abdominal radiography (anteroposterior supine vs. posteroanterior erect or lateral decubitus views), musculo-skeletal imaging (requiring at least two views for long bones and three views for joints), and even in veterinary imaging (lateral vs. ventrodorsal views). Image modalities of the images can include MRI, CT, X-ray, and others.

Figure 3:
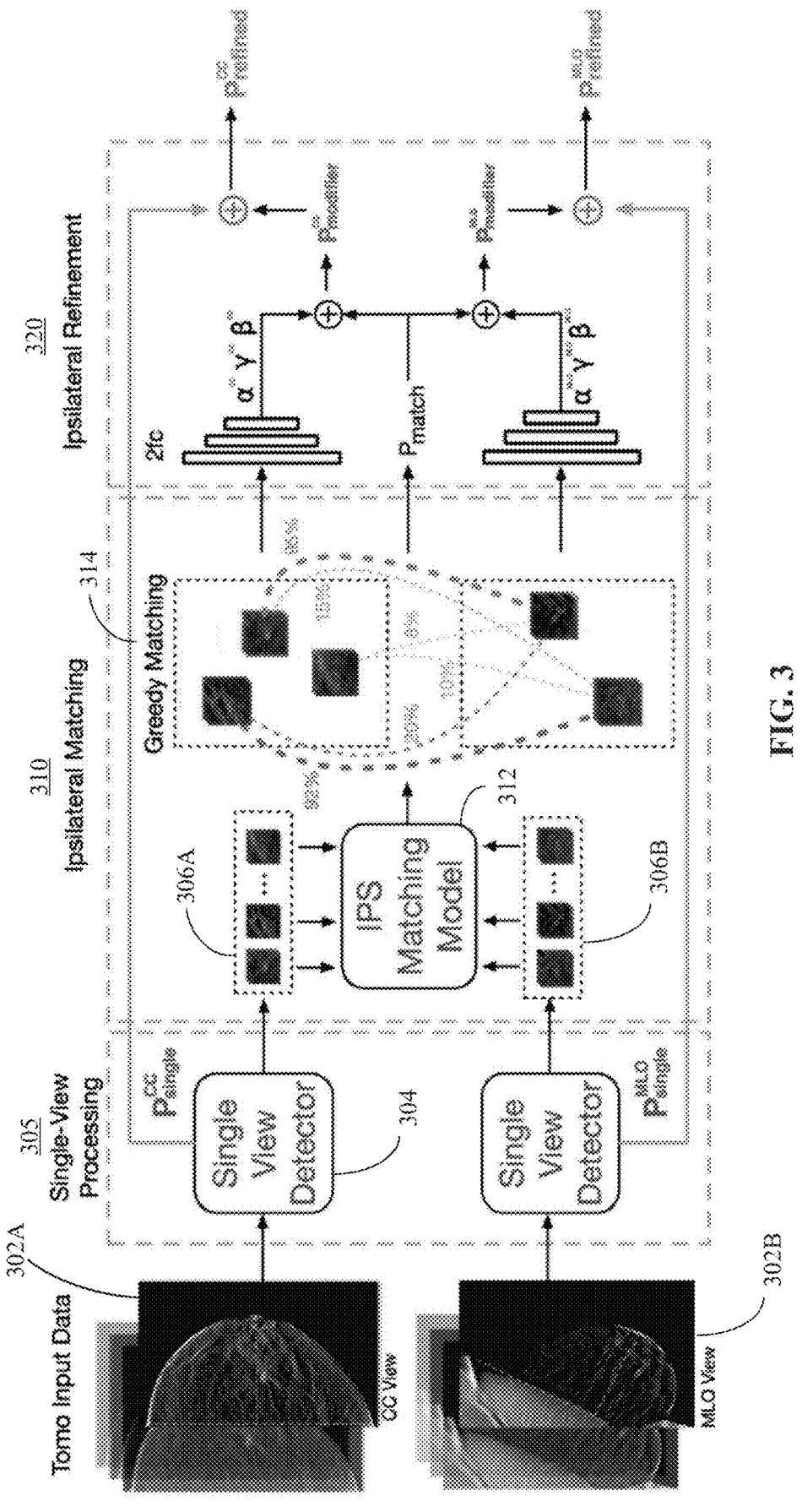
FIG. 3 shows an example three-stage pipeline for ipsilateral lesion detection.

FIG. 3 shows an example three-stage pipeline for ipsilateral lesion detection. The architecture shown in FIG. 3 can be used for mammography/digital breast tomosynthesis lesion detection scenarios. In the illustrated scenario, a pair of images of a patient are evaluated. The pair of images includes a craniocaudal (CC) view 302A and a mediolateral oblique (MLO) view 302B of the right breast of a patient. Multiple pairs of images may be evaluated by the three-stage pipeline. As shown in FIG. 3, a single-view lesion detector 304 proposes lesion candidates 306A, 306B, the ipsilateral matching stage 310 computes lesion pair similarity with greedy matching post-processing, and the ipsilateral refinement stage 320 aggregates all available information to compute the final ipsilateral detection scores.

Figure 4:
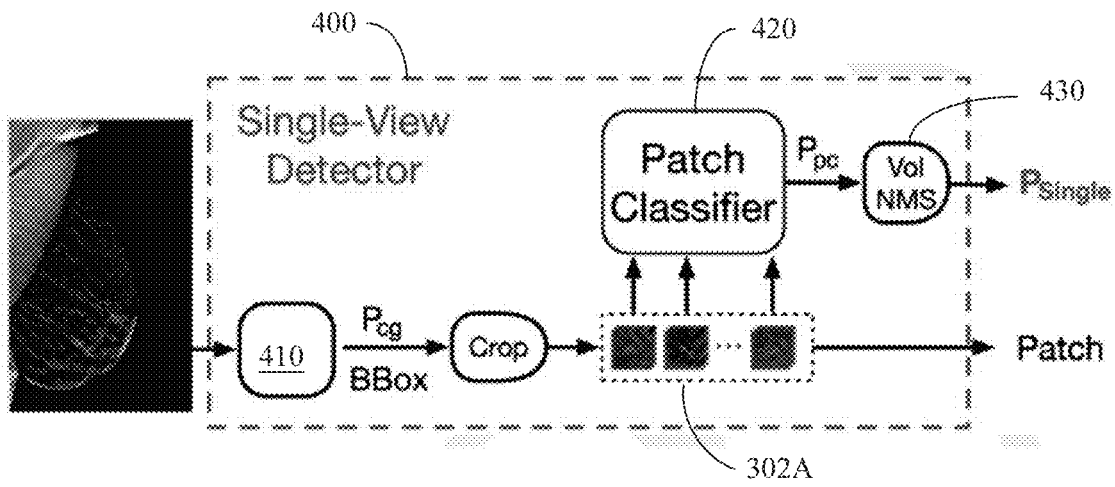
FIG. 4 illustrates an example single-view detector.

In detail, during a single-view processing stage 305, each image undergoes single-view processing using a single-view lesion detector 304 as described in more detail with respect to FIG. 4. Initial lesion candidates 306A, 306B are generated by the single-view processing stage 305 based on only local pixel information, assigning to each lesion candidate a single-view detection score (Psingle). This single-view processing stage 305 provides high-quality detection candidates 306A, 306B with sufficient specificity for the ipsilateral matching process in the second stage 310. In the second stage 310, exhaustive ipsilateral pairing can identify the most likely lesion candidate pairs. In a specific implementation, a Siamese network computes the matching probability of each ipsilateral lesion pair (pulled from lesion candidates 306A and 306B) using an ipsilateral (IPS) matching model 312 as described in more detail with respect to FIG. 5; and a greedy matching operation 314 ranks and preserves the top ipsilateral pairs. In the third stage 320, ipsilateral refinement is performed by predicting a set of per-lesion weighting factors (e.g., $\alpha$, $\beta$, $\gamma$, . . . ) for each candidate to correlate the matching probability (Pmatch) with the ipsilateral lesion score modifier (Pmodifier). The final ipsilateral detection score (Prefined) is computed by summing the modifier (Pmodifier) to the existing single-view detection score (Psingle).

FIG. 4 illustrates an example single-view detector. Referring to FIG. 4, a single-view detector 400 includes an object detection model 410 as the initial detection candidate generator (CG), and a patch classifier (PC) 420 to remove obvious false positives. Redundant detection across the volume is removed using non-maximum suppression (Vol NMS) 430.

The candidate generator (e.g., object detection model 410 in FIG. 4) can use any suitable object detection method. Single-shot object detection such as YOLO and RetinaNet can be used as fast candidate detection methods. For example, as part of a pilot study for the three-stage pipeline, a YOLO v2 model was used to process a stack of digital breast tomosynthesis (DBT) slice images to propose initial lesion candidates. A fully convolutional design for the YOLO with separate detection score and bounding-box prediction heads allow the processing of images with different sizes and aspect ratios. For each proposed lesion candidate, the model predicts a candidate generation score $$P_{cg}^i$$

as well as bounding box coordinates x, y, w, h. For each DBT slice, lesion candidates with significant overlap can be removed through Non-Maximum-Suppression (NMS) with an Intersection-Over-Union (IoU) threshold of 0.2. The model can be trained using the original YOLO loss function as follows.

$$L_{det} = L_{lesion\_score} + L_{coord\_xy} + L_{coord\_wh}.$$

The patch classifier 420 can be a simple cascaded patch classifier on top of a well-tuned candidate detection model (e.g., object detection model 410). In the three-stage pipeline, lesion patches can be generated by cropping a fixed patch size patch (e.g., 400×400×3 for the vendor product used in the pilot study) centered on the predicted x, y, and z location and fed to the patch classifier. The patch classifier can be trained using a sigmoid cross-entropy loss as follows:

$$L_{cls} = \frac{1}{N} \sum_i^N CE(P^i, y^i),$$

where N is the number of samples in a mini-batch.

All proposed patches within a volume that has a patch classification score $$P_{pc}^i > 0.01$$

are projected onto the same plane for the Volumetric Non-Maximum-Suppression (Vol-NMS) 430 operation. The predicted x, y, w, and h from the object detection model 410 and the corresponding patch classification score are used to compute the Vol-NMS output with selected IoU threshold (e.g., 0.4 in the pilot study). Surviving patches $$P_{single}^i$$

are used as the final output of the single-view detection stage. The patches and probabilities can be input to the second stage (see e.g., ipsilateral matching stage 310 of FIG. 3).

Figure 5:
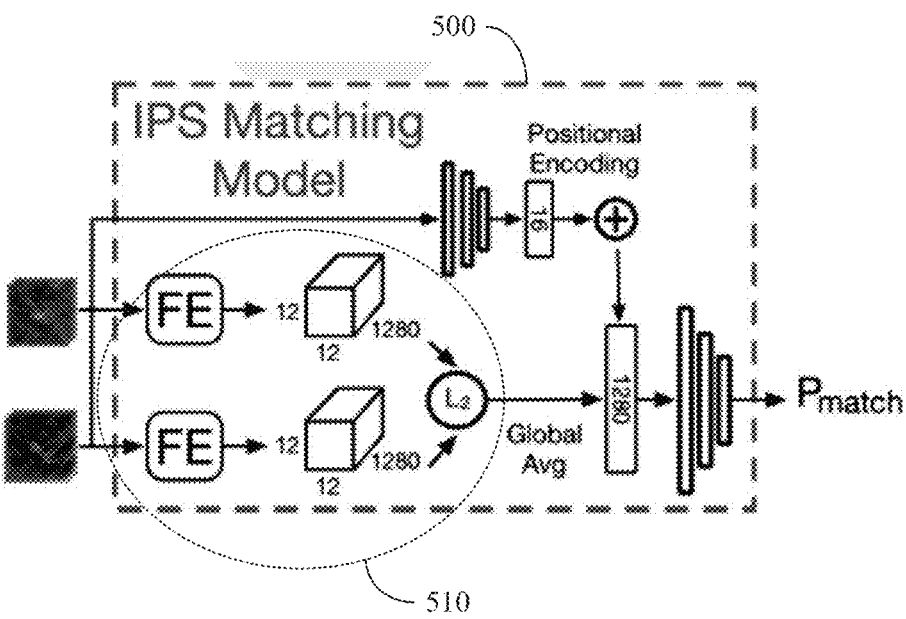
FIG. 5 shows an ipsilateral matching model.

FIG. 5 shows an ipsilateral matching model. The ipsilateral matching model 500 computes each candidate pair's matching probability based on the detection pair similarity and the relative geometric location. The techniques described herein with respect to ipsilateral image matching are suitable for other types of image pairs (e.g., Siamese network, positional encoding, etc.).

A Siamese network 510 can be used to re-identify images of the same object regardless of differences in lighting, angle, or image quality. For the pilot study, a Siamese network 510 is used to re-identify the ith and jth lesion candidates in corresponding ipsilateral views. A generic feature extraction (FE) backbone created a 12×12×1280 latent feature vector f for each lesion candidate. To aid the matching process in the pilot study, a datum line is drawn from the pectoral muscle line to measure the candidate-to-pectoral-muscle distance $$(d_{pec}^{ij})$$

and candidate-to-nipple distance $$(d_{nip}^{ij}).$$

The difference in the two distances $$\Delta d_{pec}^{ij}$$

and $$\Delta d_{nip}^{ij}$$

were embedded and concatenated to the latent features after global average pooling. Element-wise mean-square-error of the extracted feature was inputted to two fully connected (2fc) layers with 128 and 64 elements respectively to compute the matching probability, Pmatch, as follows.

$$P_{Match}^{ij} = G\left(AvgPool\left[(f_i - f_j)^2\right], \Delta d_{pec}^{ij}, \Delta d_{nip}^{ij}\right).$$

The Siamese network G was trained using sigmoid cross entropy loss as follows.

$$L_{reID} = \frac{1}{K} \sum_i^K CE\left(P_{Match}^k, P_{Match}^k\right).$$

During training, the label of kth lesion candidate pair in the mini-batch $$y_{Match}^K$$

was set to 1 only if the two candidates were from the same screening exam and had the same lesion ID, otherwise, the label was set to 0.

Returning to FIG. 3, during inference, a greedy matching operation 314 ranks ipsilateral pairs based on the predicted matching probability $$P_{Match}^{ij}$$

(as described with respect to FIG. 5). For a greedy matching operation, starting from the top-ranking ipsilateral pairs, the final pair relation is established only if both lesion candidates are not yet matched. This design is intended to mimic the intuition that each detection should have a unique ipsilateral pair in the corresponding view.

Based on the ipsilateral matching result Pmatch, the ipsilateral refinement of the third stage 320 modifies each single-view lesion detection score (Psingle). Analogous to the way radiologists perform ipsilateral matching, lesions correlated through ipsilateral views can be marked as more suspicious.

Figure 6:
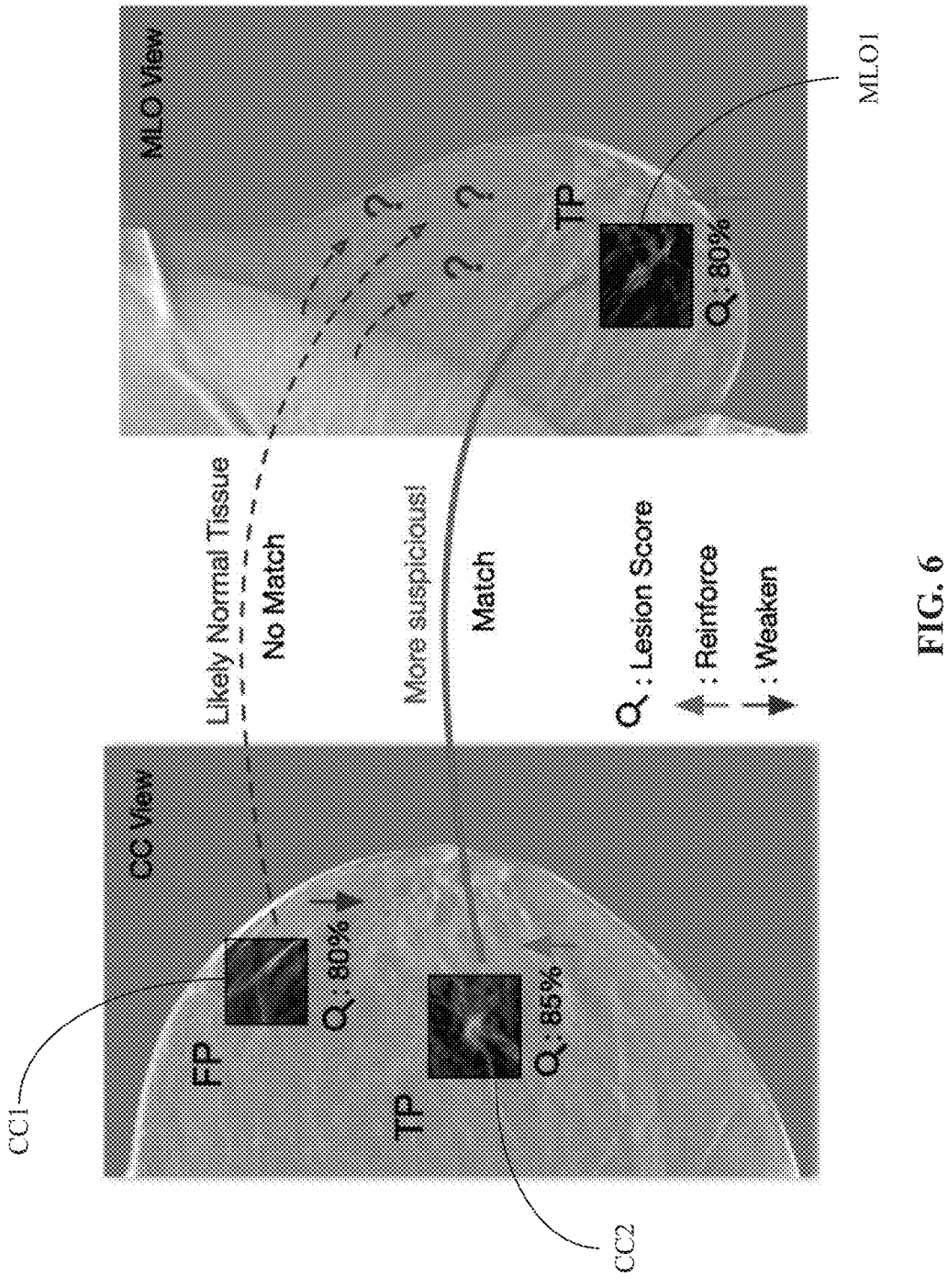
FIG. 6 illustrates an example of the ipsilateral lesion matching strategy.

FIG. 6 illustrates an example of the ipsilateral lesion matching strategy. Referring to FIG. 6, single-view lesion scores are first predicted. Here, there are two candidates for areas of interest in the CC image, CC1 and CC2, and one candidate for area of interest in the MLO image, MLO1. Similarity relations (ipsilateral matching result) between pairs are generated, for example a match result between CC2 and MLO1 and a no match result for CC1. The lesion scores (e.g., 80% for candidate CC1, 85% for candidate CC2; 80% for candidate MLO1) from the initial predictions are modified adaptively based on lesion appearance and ipsilateral matching result. Here, the refinement reinforced the match and identification of lesion corresponding to CC2 and MLO1, indicating that the area is more suspicious, and weakened the score of CC1, indicating that the area is likely normal tissue.

Returning to FIG. 3, to derive the ith modifier value $$P^{ij}_{Modifier}$$

for each lesion patch, a set of lesion-specific weighting factors are predicted to corelate the matching result (Pmatch) with an optimum modifier value. In the illustrative example, three weights are used; however, embodiments may use fewer or more weights, depending on features selected for use in the refinement step. Here, $\alpha$, $\beta$ and $\gamma$ are predicted to correlate the Pmatch with the optimum modifier value as follows.

$$P^i_{modifier} = P^i_{match} \times \alpha_i + \left(1 - P^i_{match}\right) \times \beta_i + \gamma_i.$$

These weights respectively reinforce ($\alpha$) or weaken ($\beta$) the predicted Pmatch with a bias term, generating a modifier (Pmodifier). Then the multi-view detection score (Prefined) is the sum of the modifier and the single-view detection score as follows.

$$P^i_{refined} = P^i_{single} + P^i_{modifier}.$$

Each of the $\alpha$, $\beta$ and $\gamma$ values were predicted by independent 2fc regressors with a linear output activation function. Each regressor was given the 1280 length feature vector extracted from the single-view stage patch classifier. The continuous nature of matching probability Pmatch and single-view lesions score Psingle make the task an underlying regression problem. The regressors (e.g., three regressors corresponding to the three weights) can be trained using MSE loss formulation such as follows.

$$L_{Refine} = \frac{1}{M} \sum_i^M \left(P'_{refined} - y_i\right)^2,$$

where $$P'_{refined} = \begin{cases} \text{Minimum}\left(P'_{refined}, 1\right), & \text{if } y = 1 \\ \text{Maximum}\left(P'_{refined}, 0\right), & \text{if } y = 0 \end{cases}.$$

During training, the refined scores $$P^i_{refined}$$

can be clipped from $-\infty$ to 1 if the patch is labeled as positive, and 0 to $\infty$ if the patch is labeled as negative.

In an example embodiment, a system as disclosed herein can include a computer-based platform with two related data-driven, deep-learning model algorithms. The system is configured to interface with pairs of digital tissue images containing features to be reviewed. Initial feature extraction can be performed using a Siamese network or other equivalent architecture. The first algorithm model matches lesion candidates between images and produces a similarity score for each lesion pair, which can be defined as Pmatch. The second algorithm model then refines each lesion candidate score with its matching result by constructing a set of adaptive weighting factors (e.g., $\alpha$, $\beta$, $\gamma$, . . . ) to compute the lesion score modifier (Pmodifier), where the adaptive weighting factors are unique to each lesion and are produced by independent trainable networks based on extracted lesion features. That is, $\alpha$ and $\beta$ are weights and biases that are trained using suitable datasets.

As an example, the first matching model can be trained using a Python implementation with the following configurations:

Single-view lesion detection pipeline operating point.

Type of training ipsilateral lesion pairs (true/false positive to another true/false positive).

Ratio of training positive and negative ipsilateral lesion pairs.

Type of image features and geometric features used to compute lesion similarity.

The second refinement model can be trained to apply the matching policy using the following configurations:

Single-view lesion detection pipeline operating point.

Case selection logic to apply trainable matching policy.

Matching pair selection logic to apply trainable matching policy

Choice of loss formulation.

Ipsilateral lesion score modifier formulation.

The systems and methods described herein can be implemented in hardware, software, firmware, or combinations of hardware, software and/or firmware. In some cases, a system is provided that includes hardware and software stored in memory of the hardware of the system implementing the single view detector, image matching module, and refinement module of the three-stage pipeline described herein.

In some examples, the systems and methods described in this specification may be implemented using a non-transitory computer readable medium storing computer executable instructions that when executed by one or more processors of a computer cause the computer to perform operations. Computer readable media suitable for implementing the systems and methods described in this specification include non-transitory computer-readable media, such as disk memory devices, chip memory devices, random access memory (RAM), read only memory (ROM), optical read/write memory, cache memory, magnetic read/write memory, and flash memory. Certain aspects of the described systems and methods may be implemented using processors, programmable logic devices (including field programmable gate arrays (FPGAs)) and application-specific integrated circuits. In addition, a computer readable medium that implements a system or method described in this specification may be located on a single device or computing platform or may be distributed across multiple devices or computing platforms. "Computer readable media" does not consist of propagating signals or carrier waves.

Pilot Studies

A number of studies were conducted to show feasibility and validation of the three-stage pipeline for multi-view breast cancer lesion detection.

All models were implemented using Tensorflow 2.5 in Python 3.7 with XLA compiler enabled. The networks were optimized using Adam optimizer with the default settings and learning rate of $1e^{-4}$. The candidate detection module and the patch classifier feature extraction backbones were initialized from the ImageNet pretrained MobileNetV2 weights. The ipsilateral matching model and relation block classifier were initialized from the fine-tuned patch classifier feature extractor. Each model was trained using an RTX 3090 graphics card. All models were trained using standard data augmentation techniques unless otherwise specified. During training, random brightness and window-level scaling were applied during the normalization step. Then, random scaling, cropping, and 0-360 rotation to each sample were applied to increase model generalizability. The image data included a large-scale screening tomosynthesis dataset containing exams from two major imaging manufacturers: Hologic and General Electric (GE).

Candidate Detection (e.g., object detection model 410 of single-view lesion detector 304): The candidate detection model was designed to remove obvious normal tissues from the candidate pool while maintaining cancer sensitivity. A lesion was defined as positive if it was ±3 slices in the z direction with respect to the central slice of the reference standard and having an Intersection-over-Union (IoU) larger than 0.2. On the fly during training, DBT slice images were randomly augmented, and slices were randomly cropped into 1200×1600×3 patches. Benign cases were not used as negatives in the training to avoid degrading sensitivity. Only patches with scores larger than 0.4 for Hologic and 0.8 for GE were passed into the patch classifier, thus yielding an average of 100 false positives per view (FPPI) (prior to z direction candidate merging), and ROI-level sensitivities were 98% for Hologic and 93% for GE on the validation dataset.

Patch Classifier: For classification, 400×400×3 patches were generated from the candidate detection results (e.g., at patch classifier 420). During training, standard random augmentations were again performed on the fly. A patch was labeled as positive if it was ±1 slices away from the reference standard annotation and had an IoU larger than 0.2. During inference, only patches with classification scores larger than 0.05 were merged in the z-direction and passed into the ipsilateral processing stages. This yielded an average FFPI of 5.6 and 5.1, with an ROI-level sensitivity of 96% and 92% respectively for Hologic and GE on the validation dataset.

Patch Matching: Surviving patches with a classification score larger than 0.2 for both Hologic and GE were passed into the matching model (e.g., IPS matching model 312 implemented as model 500). The same random augmentation as the patch classifier training was also applied, but the random cropping and scaling factors for each ipsilateral pair were synchronized to learn the relative size relation.

In object re-identification, the sampling of positive and negative pairs can be an important aspect. The following possible combinations of ipsilateral pairs for true-positive (TP) and false-positive (FP) patches were randomly sampled in equal ratios during training:

TP-TP positive pairs from the same cancer case.
TP-TP negative pairs from two different cancer cases.
TP-FP negative pairs from a cancer and a normal case.

FP-FP negative pairs from two different normal cases.
During training, only TP-TP positive pairs were labeled as positive, while the others were all negatives that were intentionally defined to reduce any accidental pairing. During inference, exhaustive ipsilateral pairs were formed regardless of the TP or FP label.

For each batch, there were 16 positive pairs and 48 negative pairs for a batch size of 64. The entire model remained trainable. During the pilot study, the best model iteration was selected based on batch-level classification AUC, which reached 0.95 and 0.92 respectively for Hologic and GE testing datasets.

Ipsilateral Refinement: Detection was refined using the ipsilateral modifiers. This stage (e.g., third stage 320) was trained on the lesion detection pool that survived the classification stage and NMS operation. Additionally, ipsilateral pairs were excluded when the difference in lesion-to-nipple distance was larger than 5 cm. For each lesion candidate, the matching probability was set to 0 if no valid ipsilateral detection was found.

The trainable components of the refinement module were three independent 2fc regressor heads. To train the three regressors, we first replicated the patch classifier's data pipeline, model architecture, and trained weights while attaching the three randomly initialized regressor heads. Only the newly initialized regressors remained trainable. The same augmentation during the patch classifier training was performed to prevent over-fitting. The development dataset also contained a small percentage of cases with missing ipsilateral views, for which the ipsilateral modifier was set to 0. During inference, extracted latent feature f from the patch classifier model was fed to the trained 2fc regressor heads to obtain the three weighing factors.

Advantageously, the described systems and techniques provide single-view detection results and reasoning for how the single-view detection results correspond across multiple views. For example, it is possible to output single-view detection, ipsilateral matching result, and ipsilateral refinement reasoning. Unlike other studies that directly derive the multi-view case score from extracted cases-level latent features, the described systems and methods are based on a single-view pipeline.

Unless otherwise defined, all technical terms used herein have the same meaning as commonly understood by one of ordinary skill in the art to which this disclosure belongs.

For the purposes of promoting an understanding of the principles of the present disclosure, reference may have been made to specific embodiments. It will nevertheless be understood that no limitation of the scope of the disclosure is thereby intended, such alteration and further modifications of the disclosure as illustrated herein, being contemplated as would normally occur to one skilled in the art to which the disclosure relates.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:
1. A computer readable medium storing instructions for lesion detection in paired medical imaging that when executed by a computing system cause the computing system to:

receive a set of medical images comprising at least two multi-view images of a human body part of a same patient;

detect candidate lesion regions for each medical image of the set, each candidate lesion region having a corresponding initial probability of representing a lesion;

determine a matching probability for each candidate lesion region across the set of images such that candidate lesion regions from one image of the set are assigned matching probabilities with respect to candidate lesion regions of other images of the set;

generate a modified probability for each candidate lesion region according to one or more lesion-specific weighting factors and one or more of the matching probabilities for that candidate lesion region;

adjust the initial probability of each candidate lesion region using the modified probability to generate a refined probability for each candidate lesion region; and identify the candidate lesion regions in each medical image that have refined probabilities that meet a minimum threshold probability.

2. The computer readable medium of claim 1, wherein instructions to determine the matching probability for each candidate lesion region across the set of medical images cause the computing system to:

identify pairs of candidate lesion regions across the set of medical images; and apply a greedy matching operation to each identified pair.

3. The computer readable medium of claim 2, wherein instructions to determine the matching probability for each candidate lesion region across the set of medical images comprise instructions for a Siamese network, the Siamese network being used to identify the pairs across the set of medical images.

4. The computer readable medium of claim 1, wherein the one or more lesion-specific weighting factors are predicted by independent regressors with a linear output activation function.

5. The computer readable medium of claim 1, wherein instructions to detect the areas of interest for each medical image of the set of medical images comprise instructions implementing a single-view detector.

6. The computer readable medium of claim 5, wherein the single-view detector comprises an object detection algorithm for generating an initial detection candidate and a patch classifier for removing false positives.

7. The computer readable medium of claim 1, wherein each medical image of the set of medical images is an image of a common target area.

8. The computer readable medium of claim 7, wherein common target area is a breast of a patient, the set of medical images comprising multi-view images of the breast of the patient.

9. A method of lesion detection in paired medical imaging comprising:

receiving a set of medical images comprising at least two multi-view images of a human body part of a same patient;

detecting candidate lesion regions for each medical image of the set, each candidate lesion region having a corresponding initial probability of representing a lesion;

determining a matching probability for each candidate lesion region across the set of images such that candidate lesion regions from one image of the set are assigned matching probabilities with respect to candidate lesion regions of other images of the set;

generating a modified probability for each candidate lesion region according to one or more lesion-specific weighting factors and one or more of the matching probabilities for that candidate lesion region;

adjusting the initial probability of each candidate lesion region using the modified probability to generate a refined probability for each candidate lesion region; and identifying the candidate lesion regions in each medical image that have refined probabilities that meet a minimum threshold probability.

10. The method of claim 9, wherein determining the matching probability for each candidate lesion region across the set of medical images comprises:

identifying pairs of candidate lesion regions across the set of medical images; and applying a greedy matching operation to each identified pair.

11. The method of claim 10, wherein identifying pairs of candidate lesion regions across the set of medical images comprises utilizing a Siamese network.

12. The method of claim 9, wherein the one or more lesion specific weighting factors are predicted by independent regressors with a linear output activation function.

13. The method of claim 9, wherein detecting the candidate lesion regions for each image of the set of medical images comprises using a single-view detector.

14. The method of claim 13, wherein the single-view detector comprises an object detection algorithm for generating an initial detection candidate and a patch classifier for removing false positives.

15. The method of claim 9, wherein each medical image of the set of medical images is an image of a common target area.

16. The method of claim 15, wherein the common target area is a breast of a patient, the set of medical images comprising multi-view images of the breast of the patient.

17. The method of claim 16, wherein the set of medical images comprises ipsilateral images of the breast of the patient.

\* \* \* \* \*